US012108891B2

(12) United States Patent
Miller

(10) Patent No.: US 12,108,891 B2
(45) Date of Patent: Oct. 8, 2024

(54) DEVICE FOR IMPROVED HYDRATION DURING EXERCISE

(71) Applicant: ARIZONA BOARD OF REGENTS ON BEHALF OF THE UNIVERSITY OF ARIZONA, Tucson, AZ (US)

(72) Inventor: Joseph Miller, Tucson, AZ (US)

(73) Assignee: ARIZONA BOARD OF REGENTS ON BEHALF OF THE UNIVERSITY OF ARIZONA, Tucson, AZ (US)

(*) Notice: Subject to any disclaimer, the term of this patent is extended or adjusted under 35 U.S.C. 154(b) by 330 days.

(21) Appl. No.: 17/835,618

(22) Filed: Jun. 8, 2022

(65) Prior Publication Data

US 2023/0031895 A1    Feb. 2, 2023

Related U.S. Application Data

(60) Provisional application No. 63/227,040, filed on Jul. 29, 2021.

(51) Int. Cl.
 *A47G 19/22* (2006.01)
 *A47G 21/18* (2006.01)
 *F16L 55/10* (2006.01)

(52) U.S. Cl.
 CPC ....... *A47G 19/2272* (2013.01); *A47G 21/189* (2013.01); *F16L 55/10* (2013.01)

(58) Field of Classification Search
 CPC ..... A61J 9/006; A47G 21/18; A47G 19/2272; A47G 21/189; B65D 47/32; B65D 2205/00; F16L 55/10
 See application file for complete search history.

(56) References Cited

U.S. PATENT DOCUMENTS

| 4,852,781 A * | 8/1989 | Shurnick | A45F 3/16 |
| | | | 224/267 |
| 6,929,135 B1 * | 8/2005 | Hajianpour | B65D 77/283 |
| | | | 215/229 |
| 7,204,382 B2 * | 4/2007 | Cezeaux | B65D 47/32 |
| | | | 215/229 |
| 2002/0092858 A1 * | 7/2002 | Bowman | A61J 15/0011 |
| | | | 220/709 |

* cited by examiner

*Primary Examiner* — Vishal Pancholi
*Assistant Examiner* — Robert K Nichols, II
(74) *Attorney, Agent, or Firm* — NGUYEN TARBET IP LAW

(57) ABSTRACT

The present invention is directed to a device that can easily deliver water or other sources of hydration from a bottle, directly to a user during exercise without the use of a traditional hydration bladder. The present invention features a hydration device for allowing delivery of a fluid from a container with a cap with a hole. The hydration device may comprise an outer tubing affixed around the hole and an inner tubing disposed within the outer tubing. The inner tubing may extend past both ends of the outer tubing, slide freely within the outer tubing, and extend to the bottom of the container. Both ends of both tubings may be always open. The fluid may be delivered from the container through the inner tubing when suction is applied. Air may be delivered from the outer tubing to the pre-existing container to prevent collapsing of the pre-existing container.

19 Claims, 9 Drawing Sheets

DEVICE FOR IMPROVED HYDRATION DURING EXERCISE

CROSS-REFERENCES TO RELATED APPLICATIONS

This application is a non-provisional and claims benefit of U.S. Provisional Application No. 63/227,040 filed Jul. 29, 2021, the specification of which is incorporated herein in its entirety by reference.

FIELD OF THE INVENTION

The present invention is directed to a device that can easily deliver water or other sources of hydration from a bottle, directly to a user during exercise without the use of a traditional hydration bladder.

BACKGROUND OF THE INVENTION

Those engaging in active exercises such as bike riding, hiking, or rock climbing often desire a way in which they can hydrate from water or another drink source while still exercising. The common solution for many is a bladder-style hydration pack, with a water reservoir (usually contained in a backpack) with a tube for access while exercising. Camelbak™ and other outdoor brands primarily all have devices that follow this design, but there are many inherent issues with this model, as the "bladder" or water reservoir can be messy to fill, and can accumulate bacteria and dirt easily, all while being difficult to properly wash and maintain.

In the bladder hydration system, of which the Camelbak™ is best known, an individual can drink liquids while exercising because a tube is run from a container to their mouth, and water or other liquids can be consumed in a hands-free manner. In this system, a flexible water container (bladder) is filled (and subsequently refilled) through a cap. The bladder is stored in a backpack, and at the bottom of the bladder, a long tube is run to the mouth of the subject. A "nipple" is located at the end of the tubing. As the bladder can be placed anywhere in a pack, even the bottom with many objects surrounding it, and the bladder has a soft wall, it is not uncommon for the bladder to become pressurized with respect to ambient air. Without the nipple, the liquid would come shooting out the tube under conditions of pressurization. So, under some conditions, the nipple serves to prevent leakage, but when the valve is opened (typically by biting on the nipple) liquid can come out under pressure. Alternatively, if the bladder is placed below the level of the mouth but not "squeezed" by the surrounding pack, the individual must actively suck water through the nipple, which can impair breathing.

The biggest advantage of a bladder hydration system is that it affords the ability to drink "ad lib"—meaning as thirst dictates. Using a water bottle or canteen typically requires one to stop, open and retrieve the canteen or water bottle, drink from it with one hand, and then replace the container. Using the hose and nipple allows one to drink before thirst becomes conscious. Water consumption is reported to increase when drinking is facilitated with a bladder system. Another advantage of a bladder hydration system is the conforming nature of the bladder—it can go into a pack full, and to some extent, bend into crevices and spaces in the pack. As the bladder drains, there is more room in the pack.

The most frequently cited disadvantages of the bladder system are concerns about cleanliness (the tubes and lines are difficult to wash out, and when substances other than water such as sugared electrolyte solutions are used, bacterial contamination risk is increased) as well as difficulty in judging how much water remains in the bladder that is inside the pack.

Environmental concerns aside (those being much alleviated by recycling the container) disposable containers of liquid offer several advantages. It is easy to have a variety of liquids when they are not stored in a single large container. Keeping them clean is not a concern as they are consumed once opened. Some containers have very rigid walls (example: Gatorade™) while others have very lightweight, collapsible walls (e.g. SmartWater® one-liter containers which when empty are readily collapsed).

The Smartwater® (Glaceau, New York NY) container has become something of a favorite of hikers on the Arizona Trail, where water consumption is carefully monitored and managed. A hiker has typical daily water needs of 4 to 6 liters total per day. As water weighs about 2 lb per liter, the most a hiker is able to carry at one time is one or two days of water at most. Maintaining a supply on a multiday trip requires obtaining water from springs, pools, streams, and stock tanks along the way, then filtering and purifying the water with both chemical and mechanical means. Having empty water bottles that can be filled with "dirty water" and others that are kept "clean" after the bottles that were brought at the start of the trail are consumed gives greater flexibility than afforded by a large bladder. The Smartwater® bottles hold a standard volume (one liter) in a somewhat unusual shape (the bottle is very tall and relatively "skinny", making it easy to pack) with a very lightweight but tough bottle that collapses and can "suck" water from puddles when it expands back to its original shape).

The problem with running a hose into the bottom of a water bottle through a hole in the cap is that when you suck water from the hose, there is no source of air to replace the volume of water that is consumed. You could suck a little water, then allow air to fill back along the tube but then the tube gets drained of liquid and depending upon the rigidity of the walls of the vessel, will collapse. It doesn't work very well. The problem with putting a big hole in the top of the bottle cap alongside the tube is leakage. There is no way to assure that the bottle will always be upright. If the bottle tips and water leaks through the vent hole, wastage occurs.

In some systems, a demand valve is disposed at the bottle cap. A cap is constructed that has a spring that keeps a valve shut under normal conditions. When water is removed from the bottle by sucking through the delivery tube, the valve opens to let air in to replace the volume. The spring-loaded valve is subject to contamination, as is the delivery tube that is obstructed at one end by the nipple. One other option might be a porous membrane that would allow air to pass in one direction, but surface tension prevents water from flowing in the other direction. It would be bulky if fibrous, and difficult to clean. It might offer high resistance.

The present invention proposes a new and improved system with the same purpose: to deliver quick hydration via a tube to an athlete without the exercise having to cease or a bottle having to be opened. The inventor proposes a system that fits over most existing bottles and would eliminate the need for the bladder portion. This would significantly reduce the risk of microbiological contamination and would allow the user to clean the device much easier.

BRIEF SUMMARY OF THE INVENTION

It is an objective of the present invention to provide devices and methods that allow for efficient delivery of water or other sources of hydration from a bottle, directly to a user during exercise without the use of a traditional hydration bladder, as specified in the independent claims. Embodiments of the invention are given in the dependent claims. Embodiments of the present invention can be freely combined with each other if they are not mutually exclusive.

The present invention features a hydration device for allowing the delivery of fluid from a pre-existing container with a cap with a hole. The hydration device may comprise an outer tubing having an end affixed around the hole on the cap. The hydration device may further comprise an inner tubing disposed within the outer tubing. Both ends of the inner tubing may extend past both ends of the outer tubing. The inner tubing may slide freely within the outer tubing and extend to the bottom of the pre-existing container. The hydration device may further comprise a pinch assembly for folding the outer tubing and the inner tubing over to pinch the hydration device shut when not in use to prevent leakage. Both ends of the outer tubing may be always open. Both ends of the inner tubing may be always open. The fluid may be delivered from the pre-existing container through the inner tubing when suction is applied to the inner tubing. Air may be delivered from the outer tubing to the pre-existing container to prevent collapsing of the pre-existing container.

The present invention features a method for delivering fluid from a pre-existing container utilizing a hydration device. The method may comprise providing the pre-existing container having a cap and a fluid disposed within, generating a hole in the cap, and providing the hydration device. The hydration device may comprise an outer tubing and an inner tubing. Both ends of the inner tubing may extend past both ends of the outer tubing. The inner tubing may slide freely within the outer tubing. The hydration device may further comprise a pinch assembly capable of folding the outer tubing and the inner tubing over to pinch the hydration device shut when not in use to prevent leakage. Both ends of the outer tubing may be always open. Both ends of the inner tubing may be always open. The method may further comprise directing the inner tubing through the hole in the cap and to the bottom of the pre-existing container, affixing the outer tubing around the hole in the cap, applying suction to the inner tubing, and causing fluid to travel from the bottom of the pre-existing container through the inner tubing. After this, air may be delivered from the outer tubing to the pre-existing container to prevent collapsing of the pre-existing container. The method may further comprise actuating the pinch assembly to prevent leakage.

One of the unique and inventive technical features of the present invention is the implementation of a coaxial tubing mechanism with constantly open tubing. Without wishing to limit the invention to any theory or mechanism, it is believed that the technical feature of the present invention advantageously provides for the ease of fluid delivery achieved by water bladders with the potential to be implemented in any pre-existing fluid container. None of the presently known prior references or work has the unique inventive technical feature of the present invention.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which.

DETAILED DESCRIPTION OF THE INVENTION

Figure 1:
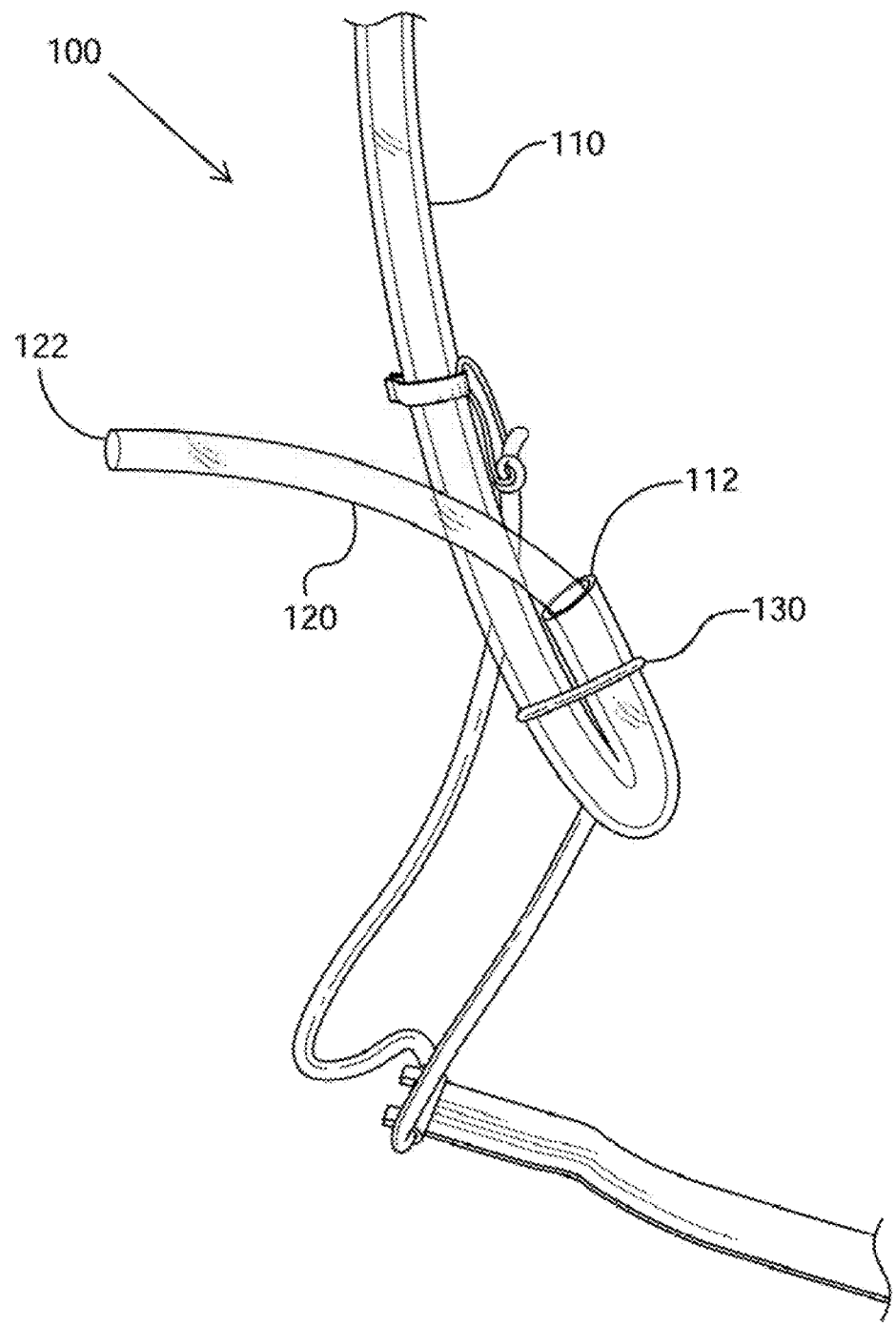
FIG. 1 shows the hydration device of the present invention in a closed state as achieved by the pinch assembly.
Figure 2:
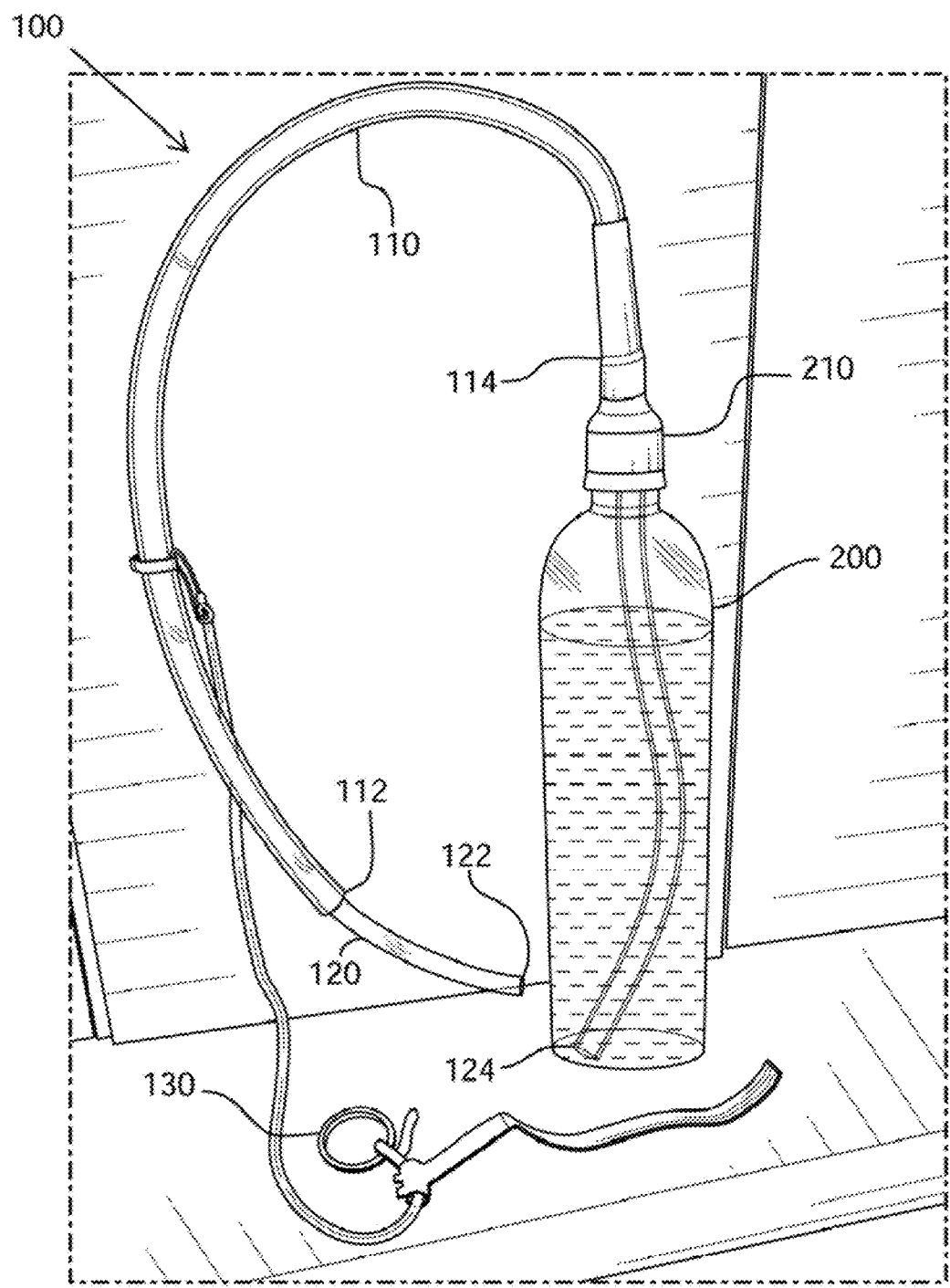
FIG. 2 shows the hydration device of the present invention in an open state implemented in a pre-existing container of fluid.

Following is a list of elements corresponding to a particular element referred to herein:
- 100 hydration device
- 110 outer tubing
- 112 outer tubing first end
- 114 outer tubing second end
- 115 plug
- 117 threaded plug
- 120 inner tubing
- 122 inner tubing first end
- 124 inner tubing second end
- 125 sleeve
- 130 pinch assembly
- 200 pre-existing container
- 210 cap Referring now to FIG. 1-2, the present invention features a hydration device (100) for allowing delivery of a fluid from a pre-existing container (200) comprising a cap (210) having a hole disposed on a surface of the cap (210). In some embodiments, the hydration device (100) may comprise an outer tubing (110) having a first end (112) and a second end (114). The second end (114) of the outer tubing (110) may be affixed around the hole on the surface of the cap (210). The hydration device (100) may further comprise an inner tubing (120) having a first end (122) and a second end (124) disposed within the outer tubing (110). The first end (122) and the second end (124) of the inner tubing (120) may extend past the first end (112) and the second end (114) of the outer tubing (110) respectively. The inner tubing (120) may slide freely within the outer tubing (110). The second end (124) of the inner tubing (120) may extend to the bottom of the pre-existing container (200). The hydration device (100) may further comprise a pinch assembly (130) capable of folding the first end (112) of the outer tubing (110) and the first end (122) of the inner tubing (120) over to pinch the hydration device (100) shut when not in use to prevent leakage.

The first end (112) and the second end (114) of the outer tubing (110) may be always open. The first end (122) and the second end (124) of the inner tubing (120) may be always open. When the device (100) is in use, the fluid may be delivered from the pre-existing container (200) through the second end (124) of the inner tubing (120) to the first end (122) of the inner tubing (120) when suction is applied to the first end (122) of the inner tubing (120). When the device (100) is in use, air may be delivered from the first end (112) of the outer tubing (110) to the pre-existing container (200) through the second end (114) to prevent collapsing of the pre-existing container (200). In some embodiments, the pre-existing container (200) may comprise a bottle or a rigid bladder. For example, the pre-existing container (200) comprises an extremely rigid fluid bladder without a tube with a wide mouth screw-on cap that has a second cap the same size as a standard bottle (about 1 to 2 inches in diameter). The outer tubing (110) may have a diameter of ⅜ to ⅝ inches and the inner tubing (120) may have a diameter of ⅛ to ¼ inches. In some embodiments, a ratio of a diameter of the inner tubing (120) to a diameter of the outer tubing (110) may be about 3:8. The pinch assembly (130) may be any component capable of closing or blocking the outer tubing (110) and the inner tubing (120) to prevent the flow of fluid or air. In some embodiments, the pinch assembly (130) may comprise a ring capable of pinching the inner tubing (120) and the outer tubing together.

In other embodiments, the pinch assembly may comprise a sleeve (125) disposed on the inner tubing (120) a distance from the first end (122) of the inner tubing (120). In some embodiments, the distance is about 4 to 8 inches from the first end (122) of the inner tubing (120). The inner tubing (120) may be folded and the fold may be guided into the sleeve (125) such that fluid cannot drain from the container (200) through the inner tubing (120) while the device (100) is not in use. The device (100) may further comprise a plug (115) disposed around the inner tubing (120) at the first end of the outer tubing (110). The plug (115) may have a size and shape such that the plug (115) is able to block an opening of the first end of the outer tubing (110) to prevent water leakage while the device (100) is not in use. In some embodiments, the plug (115) may comprise a slip fit that allows make-up air to pass through into the container (200) without allowing any fluid to drip out from the container (200) if it tips over. In some embodiments, a material of the plug (115) comprises wood, rubber, plastic, or any rigid material.

In other embodiments, pinch assembly (130) may comprise a roller pinch valve disposed around the outer tubing (110). In the roller pinch valve, the outer tubing (110) and inner tubing (120) may be directed through a tapered component comprising a slot along a length of the tapered component having a rolling component disposed in the slot. The rolling component may be moved in the slot from a less tapered portion of the tapered component to a more tapered portion of the tapered component. Thus, the distance from the rolling component to the tapered component may be decreased and the outer tubing (110) and the inner (120) tubing may be pinched. The roller pinch valve may be capable of being completely removed to allow for cleaning but still operated with one hand. The roller pinch valve may further comprise a retainer built-in at either end of the valve to snugly fit to the outer tubing (110) and prevent the roller pinch valve from falling off.

In some embodiments, the plug (115) may further comprise a threaded socket at a first end of the plug (115) facing the first end (122) of the inner tubing (120). The device (100) may further comprise a threaded plug (117) disposed around the inner tubing (120) configured to screw into the threaded socket of the plug (115). The device (100) may further comprise an o-ring disposed around the threaded socket of the plug (115). Screwing the threaded plug (117) into the threaded socket of the plug (115) may compress the o-ring and close the space through which air passes, thus preventing any leakage. Unscrewing the threaded plug (117) from the threaded socket may allow air to pass through into the container (200) and allow for fluid to be directed through the inner tubing (120).

Figure 3:
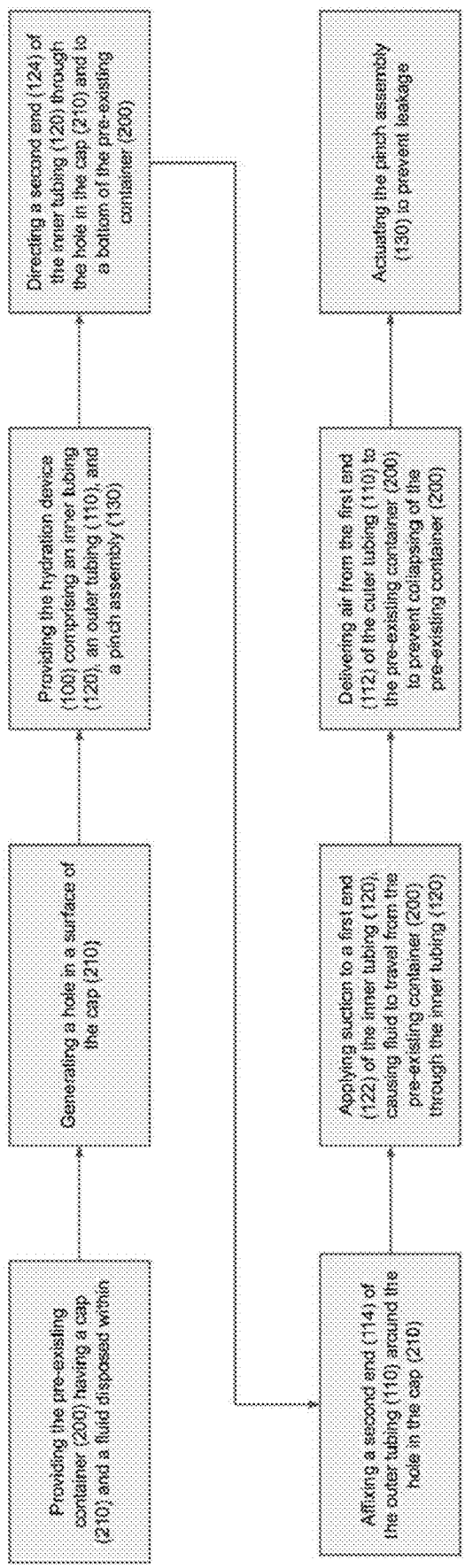
FIG. 3 shows a flow chart of a method for fluid delivery through the use of the hydration device of the presently claimed invention.
Figure 4A:
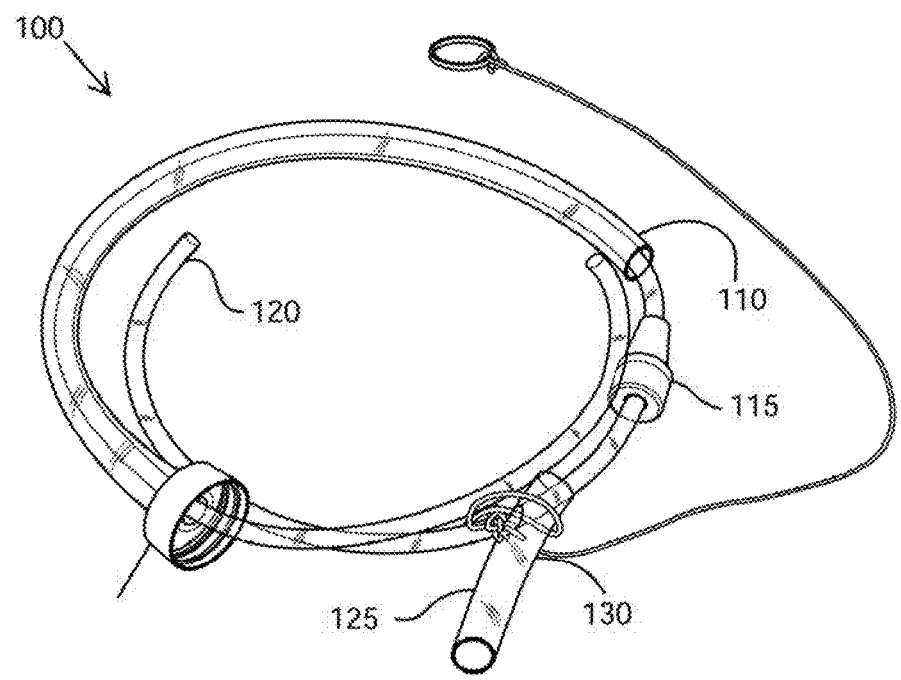
FIGS. 4A-4I show a method of applying and actuating an exemplary embodiment of the present invention comprising a plug and a pinch assembly comprising a sleeve.
Figure 4B:
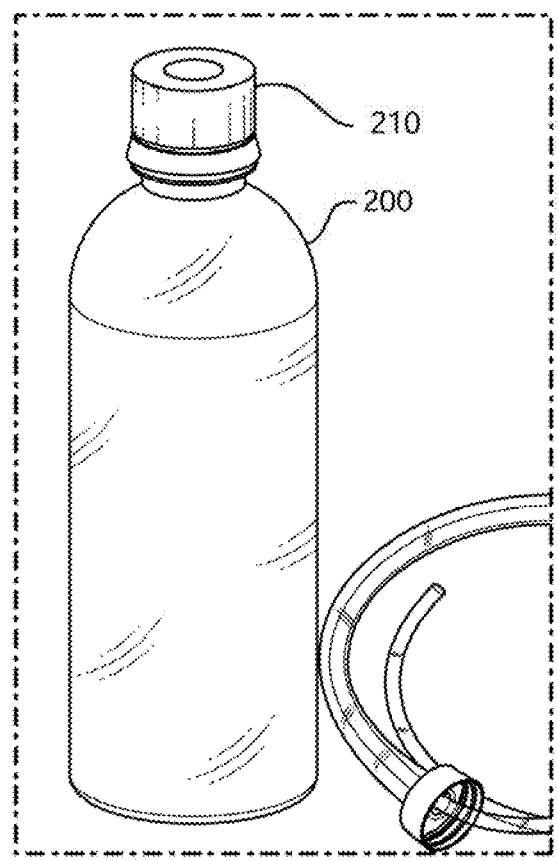
Figure 4C:
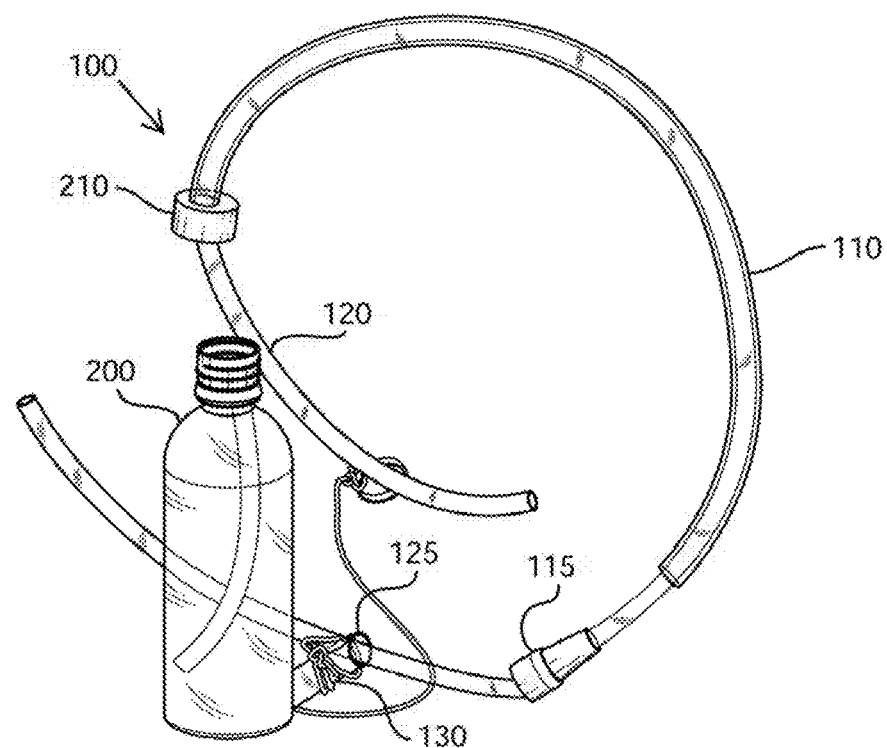
Figure 4D:
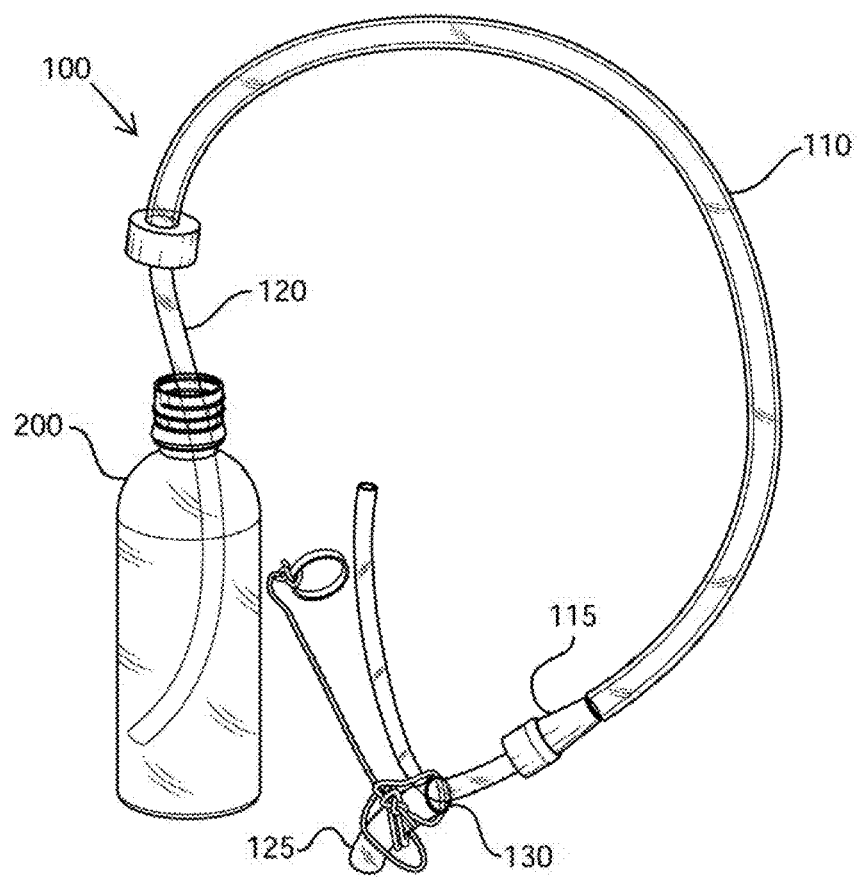
Figure 4E:
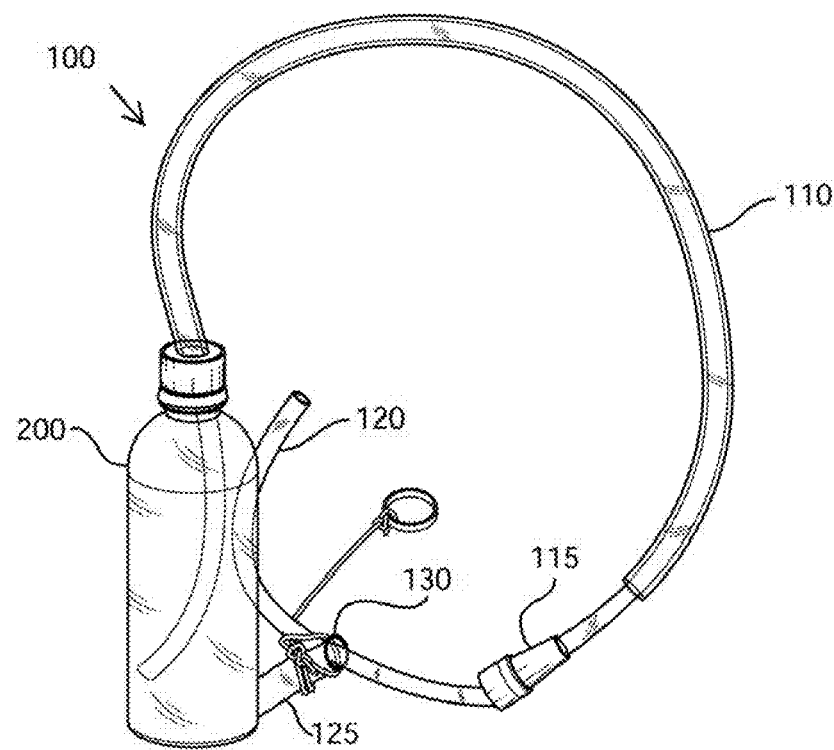
Figure 4F:
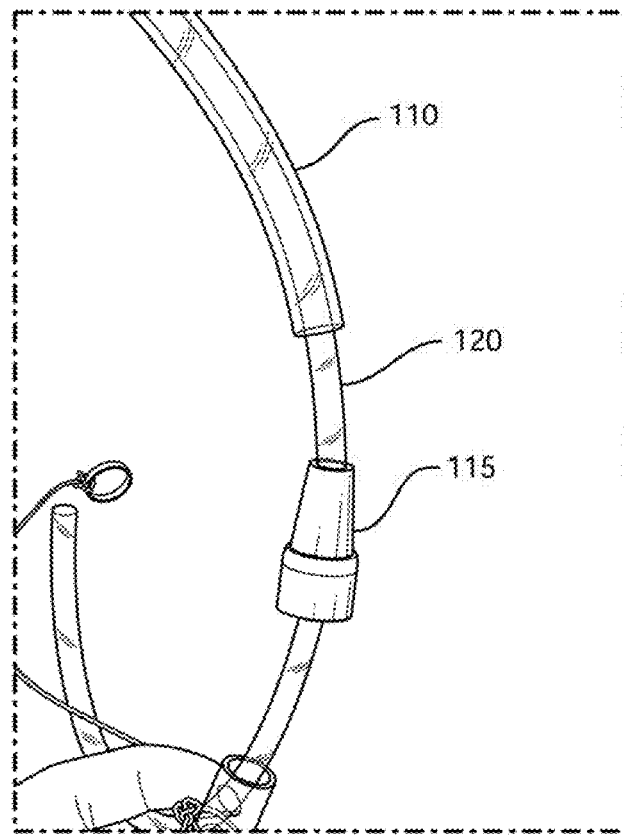
Figure 4G:
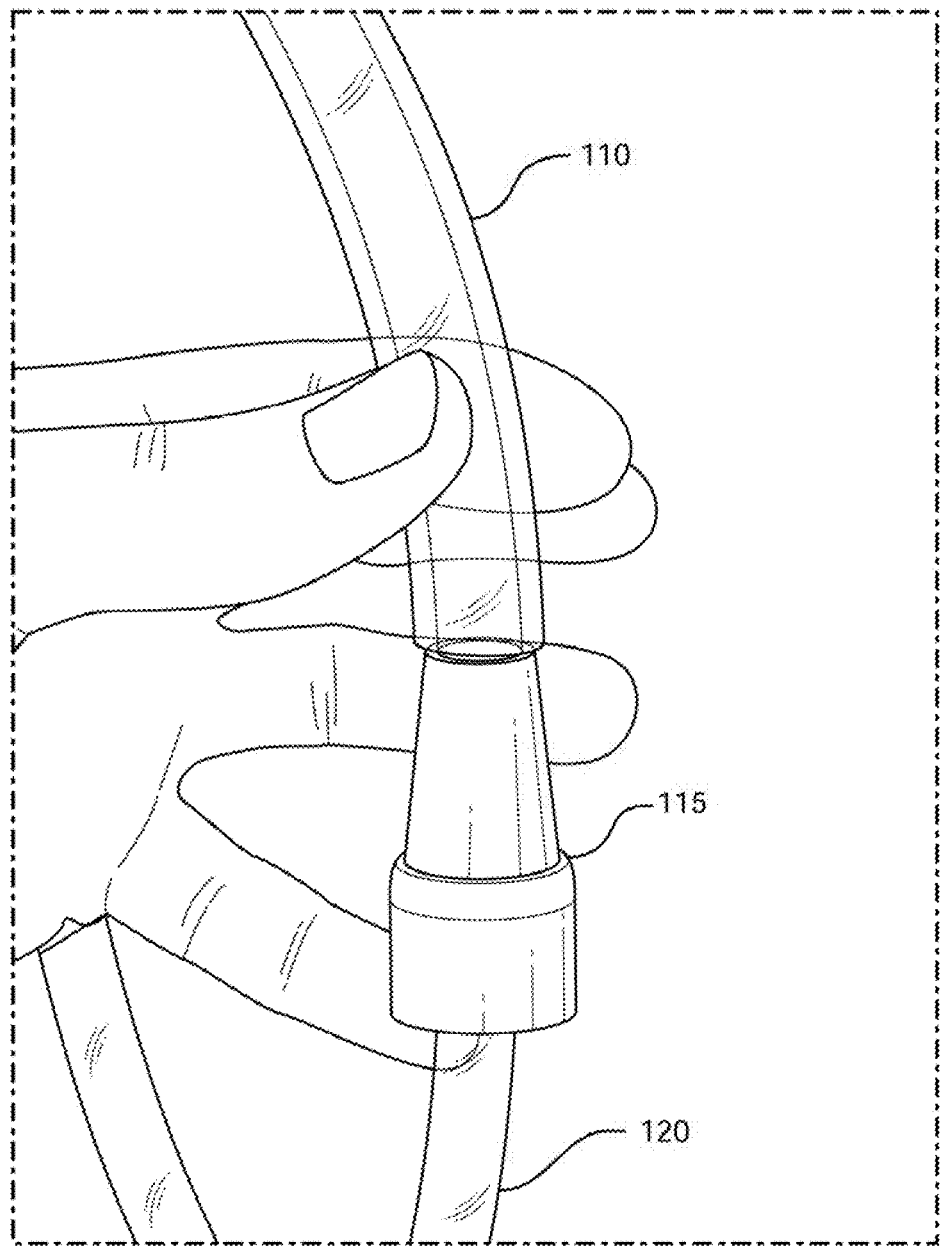
Figure 4H:
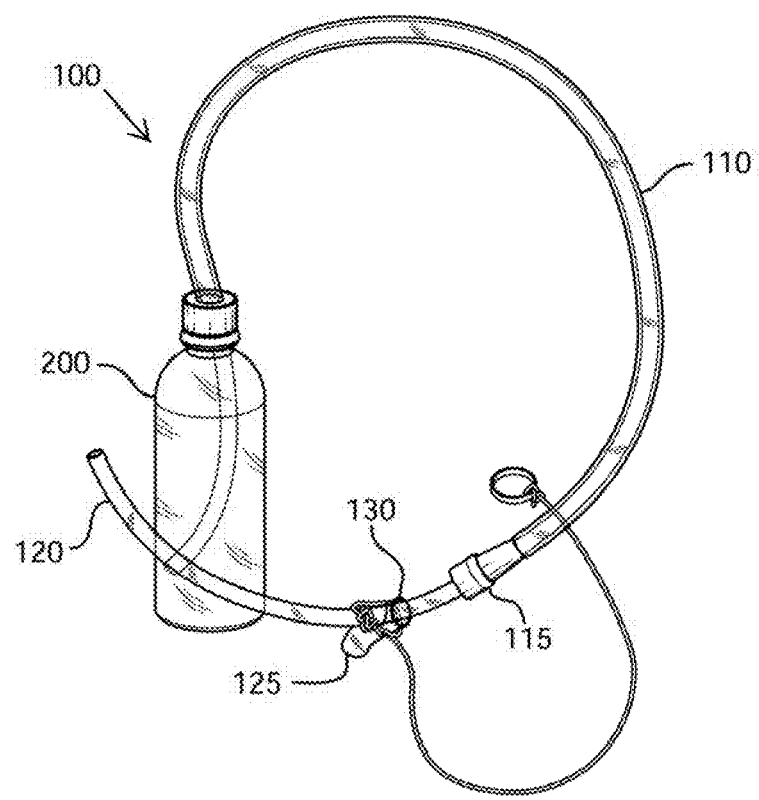
Figure 4I:
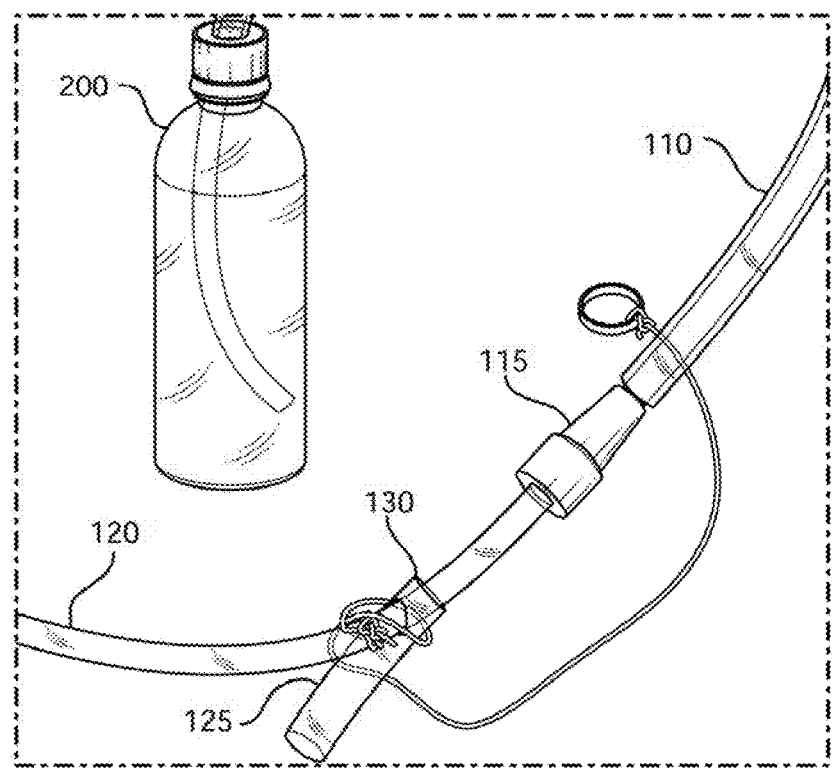
Figure 5:
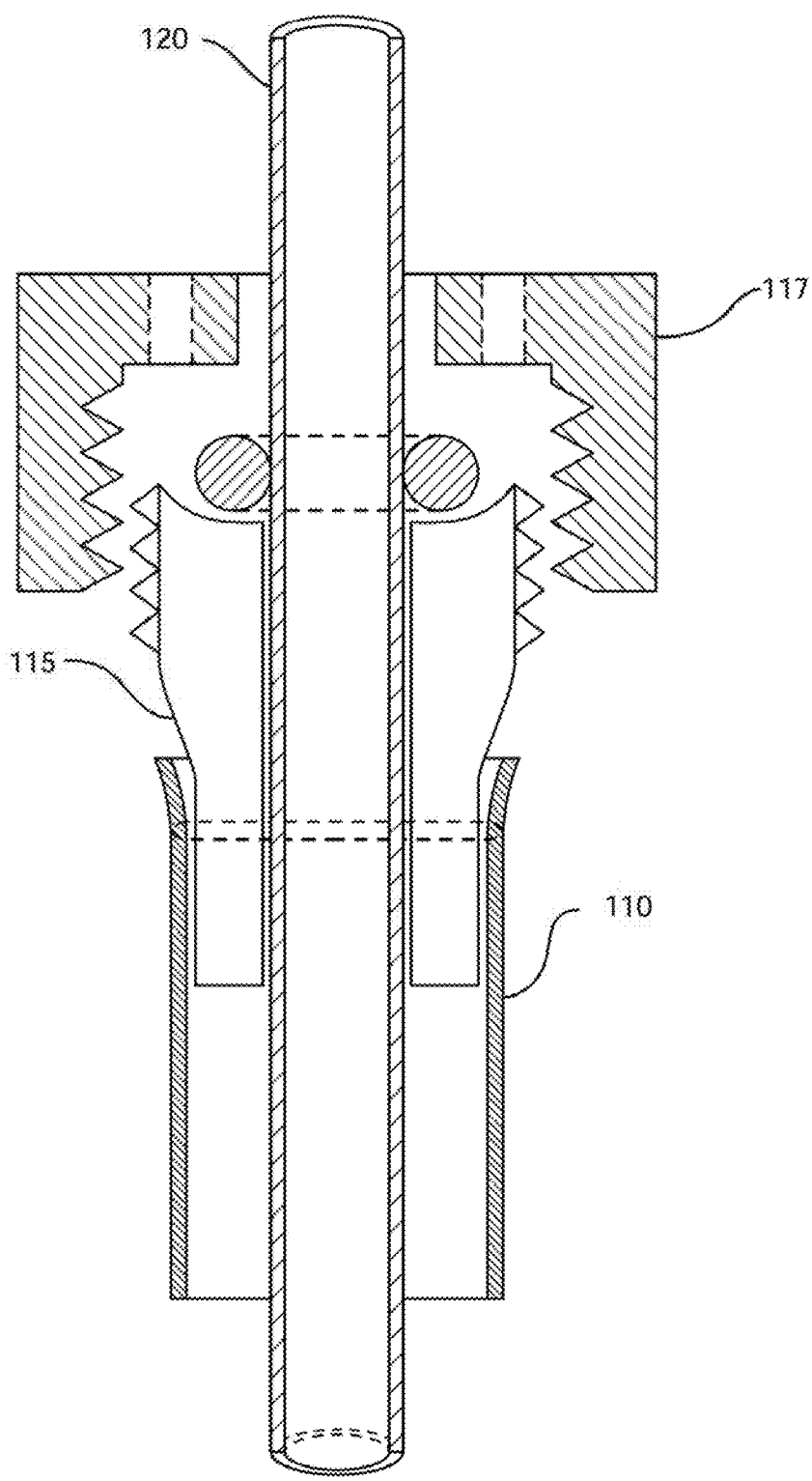
FIG. 5 shows a close-up view of the plug mechanism of the presently claimed invention.

Referring now to FIG. 3, the present invention features a method for delivering fluid from a pre-existing container (200) utilizing a hydration device (100). In some embodiments, the method may comprise providing the pre-existing container (200) having a cap (210) and a fluid disposed within, generating a hole in a surface of the cap (210), and providing the hydration device (100). In some embodiments, the hydration device (100) may comprise an outer tubing (110) having a first end (112) and a second end (114), and an inner tubing (120) having a first end (122) and a second end (124) disposed within the outer tubing (110). The first end (122) and the second end (124) of the inner tubing (120) may extend past the first end (112) and the second end (114) of the outer tubing (110) respectively. The inner tubing (120) may slide freely within the outer tubing (110). The hydration device (100) may further comprise a pinch assembly (130) capable of folding the first end (112) of the outer tubing (110) and the first end (122) of the inner tubing (120) over to pinch the hydration device (100) shut when not in use to prevent leakage. The pinch assembly (130) may be any component capable of closing or blocking the outer tubing (110) and the inner tubing (120) to prevent the flow of fluid or air.

In some embodiments, the first end (112) and the second end (114) of the outer tubing (110) may be always open. In some embodiments, the first end (122) and the second end (124) of the inner tubing (120) may be always open. The method may further comprise directing the second end (124) of the inner tubing (120) through the hole in the cap (210) and to a bottom of the pre-existing container (200), affixing the second end (114) of the outer tubing (110) around the hole in the cap (210), applying suction to the first end (122) of the inner tubing (120), and causing fluid to travel from the bottom of the pre-existing container (200) through the second end (124) of the inner tubing (120) to the first end (122) of the inner tubing (120). After this, air may be delivered from the first end (112) of the outer tubing (110) to the pre-existing container (200) through the second end (114) to prevent collapsing of the pre-existing container (200). The method may further comprise actuating the pinch assembly (130) to prevent leakage. In some embodiments, the pre-existing container (200) may comprise a bottle or a rigid bladder. For example, the pre-existing container (200) may comprise an extremely rigid fluid bladder without a tube with a wide mouth screw-on cap that has a second cap the same size as a standard bottle (about 1 to 2 inches in diameter). In other embodiments, the pre-existing container (200) may comprise any container with a wide mouth screw-on cap compatible with the present invention. The outer tubing (110) may have a diameter of ⅜ to ⅝ inches and the inner tubing (120) may have a diameter of ⅛ to ¼ inches. In some embodiments, a ratio of a diameter of the inner tubing (120) to a diameter of the outer tubing (110) may be about 3:8. In some embodiments, the pinch assembly (130) may comprise a ring capable of pinching the inner tubing (120) and the outer tubing together.

In other embodiments, pinch assembly (130) may comprise a roller pinch valve disposed around the outer tubing (110). In the roller pinch valve, the outer tubing (110) and inner tubing (120) may be directed through a tapered component comprising a slot along a length of the tapered component having a rolling component disposed in the slot. The rolling component may be moved in the slot from a less tapered portion of the tapered component to a more tapered portion of the tapered component. Thus, the distance from the rolling component to the tapered component may be decreased and the outer tubing (110) and the inner (120) tubing may be pinched. The roller pinch valve may be capable of being completely removed to allow for cleaning but still operated with one hand. The roller pinch valve may further comprise a retainer built-in at either end of the valve to snugly fit to the outer tubing (110) and prevent the roller pinch valve from falling off.

EXAMPLE

The following is a non-limiting example of the present invention. It is to be understood that said example is not intended to limit the present invention in any way. Equivalents or substitutes are within the scope of the present invention.

The device comprised a shorter length of ½" ID Tygon tubing that served as the outer lumen of the device, a longer length of ³⁄₁₆" ID Tygon tubing for the inner lumen, a cap for the bottle that has a ⁹⁄₁₆" hole punched into it, some adhesive to affix the larger diameter tubing to the cap, and a short length of cord affixed to the outer tubing and to a ring that allowed the coaxial assembly to be folded over and pinched shut. The idea is to have a way to close both the inner and outer lumen at the top of the tube with no leakage at the bottom.

Because both tubes were open at both ends, it was easy to clean the tubes. Because there was no nipple on the end of the inner lumen, liquid could flow with greater ease. Because the inner cannula slid freely inside the outer cannula, the inner tube could easily be advanced to a length that reaches the bottom of the liquid container. Because the inside diameter of the outer lumen was sufficiently larger than the outer diameter of the inside lumen, there is enough cross-sectional area for air to flow easily without needing to "suck" hard.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A hydration device (100) for allowing delivery of a fluid from a pre-existing container (200) comprising a cap (210) having a hole disposed on a surface of the cap (210), the hydration device (100) comprising:
   a. an outer tubing (110) having a first end (112) and a second end (114);
   b. an inner tubing (120) having a first end (122) and a second end (124) disposed within the outer tubing (110), wherein the first end (122) and the second end (124) of the inner tubing (120) extend past the first end (112) and the second end (114) of the outer tubing (110) respectively, wherein the inner tubing (120) slides freely within the outer tubing (110); and
   c. a pinch assembly (130) capable of folding the first end (112) of the outer tubing (110) and the first end (122) of the inner tubing (120) to pinch the hydration device (100) shut when not in use to prevent leakage;
   wherein when the device (100) is in use, the second end (114) of the outer tubing (110) is affixed around the hole on a surface of the cap (210), wherein the second end (124) of the inner tubing (120) extends through the hole of the cap into the pre-existing container (200);
   wherein the first end (112) and the second end (114) of the outer tubing (110) are always open;
   wherein the first end (122) and the second end (124) of the inner tubing (120) are always open;
   wherein the fluid is delivered from the pre-existing container (200) through the second end (124) of the inner tubing (120) to the first end (122) of the inner tubing (120) when suction is applied to the first end (122) of the inner tubing (120), and air is delivered from the first end (112) of the outer tubing (110) to the pre-existing container (200) through the second end (114) to prevent collapsing of the pre-existing container (200).

2. The hydration device (100) of claim 1, wherein the pre-existing container (200) comprises a bottle or a rigid bladder.

3. The hydration device (100) of claim 1, wherein the outer tubing (110) has a diameter of ⅜ to ⅝ inches.

4. The hydration device (100) of claim 1, wherein the inner tubing (120) has a diameter of ⅛ to ¼ inches.

5. The hydration device (100) of claim 1, wherein a ratio of a diameter of the inner tubing (120) to a diameter of the outer tubing (110) is about 3:8.

6. The hydration device (100) of claim 1, wherein the pinch assembly (130) comprises a sleeve (125), wherein folding the inner tubing (120) and directing the first end (122) through the sleeve (125) prevents fluid from leaking from the container (200).

7. The hydration device (100) of claim 1, wherein the pinch assembly (130) comprises a roller pinch valve disposed around the outer tubing (110).

8. A method for delivering fluid from a pre-existing container (200) utilizing a hydration device (100), the method comprising:
   a. providing the pre-existing container (200) having a cap (210) and a fluid disposed within;
   b. generating a hole in a surface of the cap (210);
   c. providing the hydration device (100) comprising:
      i. an outer tubing (110) having a first end (112) and a second end (114);
      ii. an inner tubing (120) having a first end (122) and a second end (124) disposed within the outer tubing (110), wherein the first end (122) and the second end (124) of the inner tubing (120) extend past the first end (112) and the second end (114) of the outer tubing (110) respectively, wherein the inner tubing (120) slides freely within the outer tubing (110); and iii. a pinch assembly (130) capable of folding the first end (112) of the outer tubing (110) and the first end (122) of the inner tubing (120) over to pinch the hydration device (100) shut when not in use to prevent leakage;

wherein the first end (112) and the second end (114) of the outer tubing (110) are always open;

wherein the first end (122) and the second end (124) of the inner tubing (120) are always open;

d. directing the second end (124) of the inner tubing (120) through the hole in the cap (210) and to a bottom of the pre-existing container (200);

e. affixing the second end (114) of the outer tubing (110) around the hole in the cap (210);

f. applying suction to the first end (122) of the inner tubing (120), causing fluid to travel from the bottom of the pre-existing container (200) through the second end (124) of the inner tubing (120) to the first end (122) of the inner tubing (120), wherein air is delivered from the first end (112) of the outer tubing (110) to the pre-existing container (200) through the second end (114) to prevent collapsing of the pre-existing container (200); and g. actuating the pinch assembly (130) to prevent leakage.

9. The method of claim 8, wherein the pre-existing container (200) comprises a bottle or a rigid bladder.

10. The method of claim 8, wherein the outer tubing (110) has a diameter of ⅜ to ⅝ inches.

11. The method of claim 8, wherein the inner tubing (120) has a diameter of ⅛ to ¼ inches.

12. The method of claim 8, wherein a ratio of a diameter of the inner tubing (120) to a diameter of the outer tubing (110) is about 3:8.

13. The method of claim 8, wherein the pinch assembly (130) comprises a sleeve (125), wherein folding the inner tubing (120) and directing the first end (122) through the sleeve (125) prevents fluid from leaking from the container (200).

14. The method of claim 8, wherein the pinch assembly (130) comprises a roller pinch valve disposed around the outer tubing (110).

15. A hydration device (100) for allowing delivery of a fluid from a pre-existing container (200) comprising an opening, the hydration device (100) comprising:

a. an outer tubing (110);

b. an inner tubing (120) disposed within the outer tubing (110), each end of the inner tubing (120) extends past each end of the outer tubing (110), wherein the inner tubing (120) slides freely within the outer tubing (110); and c. a pinch assembly (130) capable of folding the outer tubing (110) and the inner tubing (120) over to pinch the hydration device (100) shut when the device (100) is not in use to prevent leakage;

wherein when the device (100) is in use, the end of the outer tubing (110) is affixed to the opening of the container (200);

wherein the inner tubing (120) extends into the pre-existing container (200);

wherein the fluid is delivered from the pre-existing container (200) through the inner tubing (120) when suction is applied to the inner tubing (120), and air is delivered from the outer tubing (110) to the pre-existing container (200) to prevent collapsing of the pre-existing container (200).

16. The hydration device (100) of claim 15, wherein the pre-existing container (200) comprises a bottle or a rigid bladder.

17. The hydration device (100) of claim 15, wherein a ratio of a diameter of the inner tubing (120) to a diameter of the outer tubing (110) is about 3:8.

18. The hydration device (100) of claim 15, wherein the pinch assembly (130) comprises a sleeve (125), wherein folding the inner tubing (120) and directing a first end (122) through the sleeve (125) prevents fluid from leaking from the container (200).

19. The hydration device (100) of claim 15, wherein the pinch assembly (130) comprises a roller pinch valve disposed around the outer tubing (110).

* * * * *